United States Patent
Lin

(10) Patent No.: US 9,813,265 B2
(45) Date of Patent: Nov. 7, 2017

(54) RECEIVER DC OFFSET CALIBRATION WITH ANTENNA CONNECTED

(71) Applicant: GainSpan Corporation, San Jose, CA (US)

(72) Inventor: Qiang Lin, San Jose, CA (US)

(73) Assignee: GainSpan Corporation, San Jose, CA (US)

( * ) Notice: Subject to any disclaimer, the term of this patent is extended or adjusted under 35 U.S.C. 154(b) by 0 days.

(21) Appl. No.: 14/686,688

(22) Filed: Apr. 14, 2015

(65) Prior Publication Data

US 2016/0308695 A1    Oct. 20, 2016

(51) Int. Cl.
H04L 25/06    (2006.01)
H04B 17/21    (2015.01)

(52) U.S. Cl.
CPC ............ *H04L 25/061* (2013.01); *H04B 17/21* (2015.01)

(58) Field of Classification Search
CPC . H04B 2001/305; H04B 17/21; H04L 25/061; H03D 3/008
See application file for complete search history.

(56) References Cited

U.S. PATENT DOCUMENTS

| | | | |
|---|---|---|---|
| 5,623,227 A * | 4/1997 | Everline | H03F 1/3229 330/151 |
| 5,650,769 A * | 7/1997 | Campana, Jr. | G08B 21/0222 340/539.1 |
| 6,434,186 B2 | 8/2002 | Dowling | |
| 6,859,488 B2 | 2/2005 | Azenkot et al. | |
| 7,941,682 B2 | 5/2011 | Adams | |
| 8,321,626 B2 | 11/2012 | Hiremath et al. | |
| 8,526,604 B2 | 9/2013 | Batra et al. | |
| 8,583,812 B2 | 11/2013 | Vyas et al. | |
| 8,665,744 B2 | 3/2014 | Viswanathan et al. | |
| 8,755,404 B2 | 6/2014 | Viswanathan et al. | |
| 8,761,066 B2 | 6/2014 | Vyas et al. | |
| 8,831,121 B1 | 9/2014 | Qi et al. | |
| 9,413,574 B1 * | 8/2016 | Timofeev | H04L 27/01 |
| 2002/0042256 A1 * | 4/2002 | Baldwin | H03D 3/008 455/232.1 |
| 2003/0223573 A1 | 12/2003 | Tehernezhaadi | |
| 2005/0153676 A1 | 7/2005 | Ruelke et al. | |
| 2005/0219092 A1 | 10/2005 | Chang et al. | |
| 2005/0237984 A1 | 10/2005 | Benveniste | |
| 2006/0280268 A1 * | 12/2006 | Sobchak | H04B 1/30 375/349 |
| 2007/0211748 A1 | 9/2007 | Stephens | |
| 2008/0195821 A1 | 8/2008 | Adams et al. | |
| 2008/0195918 A1 | 8/2008 | Adams | |
| 2008/0232256 A1 | 9/2008 | Douglas et al. | |
| 2008/0297365 A1 | 12/2008 | Welles et al. | |
| 2008/0310337 A1 | 12/2008 | Welles | |
| 2009/0016251 A1 | 1/2009 | Adams et al. | |

(Continued)

OTHER PUBLICATIONS

Office Action in U.S. Appl. No. 14/519,063, mailed Apr. 6, 2016.

(Continued)

*Primary Examiner* — Aristocratis Fotakis
(74) *Attorney, Agent, or Firm* — Pearl Cohen Zedek Latzer Baratz LLP

(57) ABSTRACT

Systems and methods for determining the DC offset of a wireless device including the antenna are disclosed. Systems and methods for calibrating or cancelling the DC offset are also disclosed.

11 Claims, 10 Drawing Sheets

(56) References Cited

U.S. PATENT DOCUMENTS

| | | |
|---|---|---|
| 2009/0077404 A1 | 3/2009 | Herring et al. |
| 2010/0067626 A1 | 3/2010 | Sankabathula et al. |
| 2010/0086017 A1* | 4/2010 | Shumarayev ........... H04L 1/205 375/232 |
| 2010/0135447 A1 | 6/2010 | Sapozhnykov et al. |
| 2011/0215857 A1* | 9/2011 | Nonin ....................... H03L 5/00 327/307 |
| 2013/0114643 A1 | 5/2013 | Shope et al. |
| 2013/0195215 A1* | 8/2013 | Manglani ............. H04B 17/318 375/295 |
| 2013/0272180 A1 | 10/2013 | Hiremath et al. |
| 2013/0290377 A1 | 10/2013 | Purohit |
| 2013/0294426 A1 | 11/2013 | Vyas et al. |
| 2014/0044158 A1* | 2/2014 | Raghu ................. H04L 27/3863 375/224 |
| 2014/0169349 A1 | 6/2014 | Vyas et al. |
| 2014/0192691 A1 | 7/2014 | Vyas et al. |
| 2014/0211674 A1 | 7/2014 | Hiremath |
| 2015/0365118 A1* | 12/2015 | Khan ................... H03G 3/3052 375/219 |
| 2016/0112955 A1 | 4/2016 | Grau |
| 2016/0308695 A1 | 10/2016 | Lin |
| 2016/0309353 A1 | 10/2016 | Lin |

OTHER PUBLICATIONS

Yin et al., "Calibration Techniques for Low-Power Wireless Multiband Transceiver", Hindawi Publishing Corporation, Int'l Journal of Distributed Sensor Networks, vol. 2013, Article 754206, 8 pgs.

\* cited by examiner

RECEIVER DC OFFSET CALIBRATION WITH ANTENNA CONNECTED

BACKGROUND

1. Field

The present disclosure relates generally to wireless devices, and, more specifically, to systems and methods for determining and calibrating DC offset in a wireless device with the antenna connected.

2. Related Art

A wireless network generally includes two or more wireless devices that communicate with each other over a wireless medium. One example of a wireless network is a wireless local area network (WLAN) designed to operate according to IEEE 802.11 standards.

DC offset is usually undesirable because it causes saturation or change in the operating point of an amplifier in the wireless device. When a receiver (or wireless chipset) is integrated in a final product and connected to an antenna, it is exposed to all kind of interferences from other transmitters, microwave ovens, other appliances, and the like. DC Offset is particularly sensitive to input impedance. Although a manufacturer of a wireless chipset could calibrate the chipset itself, the final product would still suffer from DC offset because the impedance of the antenna is different for each product. In addition, DC offset can also be affected whenever there is saturation caused by interferences or when there is interference at very low frequency offsets from LO frequencies.

Examples of factors that affect DC offset measurements include the non-linear effect of high power jammers, carrier leakage or subcarrier close to receiver local oscillator (LO) frequency, leakage power that is smaller than total interference power, leakage phase that is zero-mean random process, transmitter and receiver are asynchronous, and the delay in propagation is random. Depending on the LO leakage power level, all receivers suffer from DC offset caused by self-mixing of the LO with its leakage. Therefore, DC offset in the receive paths varies across the designs as the antenna impedance changes. It is impossible and impractical to predict the impedance in the final products; thus, it is impossible to predict the DC offset in the final products. This uncertainty causes a problem in determining DC offset cancellation.

While FFT based spectrum analysis may allow for detection and elimination of some interferences, it requires higher resolution and very complicated algorithms to analyze the spectrum. Additionally, manufacturer calibration is expensive, and it is even more expensive to calibrate over variations in temperature.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

DC offset is a universal problem in receivers, especially in receivers using direct conversion architecture. One major contributor of DC offset is the self-mixing of the LO leakage with LO itself. The antenna is the key component in this scenario. Therefore, it is important to be able to measure and cancel the DC in the receiver with the antenna connected to the receiver input. With the antenna connected, inevitably interferences are picked up by the receiver at the time of measurements. Embodiments of the invention relate to systems and methods that can tolerate interferences and still provide accurate DC measurements and cancel DC out of the receive chain. Further embodiments of the invention relate to DC offset calibration that can be performed with the antenna connected, after the wireless chipset is integrated into the final product.

In accordance with an aspect of the invention, a wireless device is disclosed that includes a receiver to receive a receive signal from one or more other wireless devices; an antenna connected to the receiver; a processor to determine a DC offset value of the wireless device with antenna connected, and calibrate the wireless device using the determined DC offset value; and memory to store the DC offset value.

The wireless device may further include a digital to analog converter, and wherein the wireless device is calibrated by adjusting the value at the digital to analog converter.

The wireless device may further include a receive chain, and wherein the wireless device is calibrated by adjusting the gain at the receive chain.

The wireless device may be calibrated by adjusting the gain in multiple components of the wireless device.

In accordance with yet another aspect of the invention, a method is disclosed that includes performing an energy detection algorithm on a plurality of received signals at a wireless device having an antenna connected thereto; and applying an averaging algorithm to determine the DC offset of the wireless device.

The method may further include performing a calibration algorithm to adjust the DC cancellation based on the determined DC offset. The DC cancellation may be adjusted in a closed-loop fashion to cancel the DC offset to within a predefined range for the wireless device.

The method may further include receiving a signal. Performing the energy detection algorithm may include determining the total energy of the received signal. Performing the energy detection algorithm may further include comparing the total energy determined with previously averaged values of energy of received signals. Data captured from the received signal may be discarded if the total energy is higher than the previously averaged value. The total energy may be used to update the previously averaged value if the total energy is the same as or lower than the previously averaged value.

The wireless device may be calibrated by adjusting the gain at a digital to analog converter. The wireless device may be calibrated by adjusting the gain at a receive chain. The wireless device may be calibrated by adjusting the gain in multiple components of the wireless device.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Figure 1:
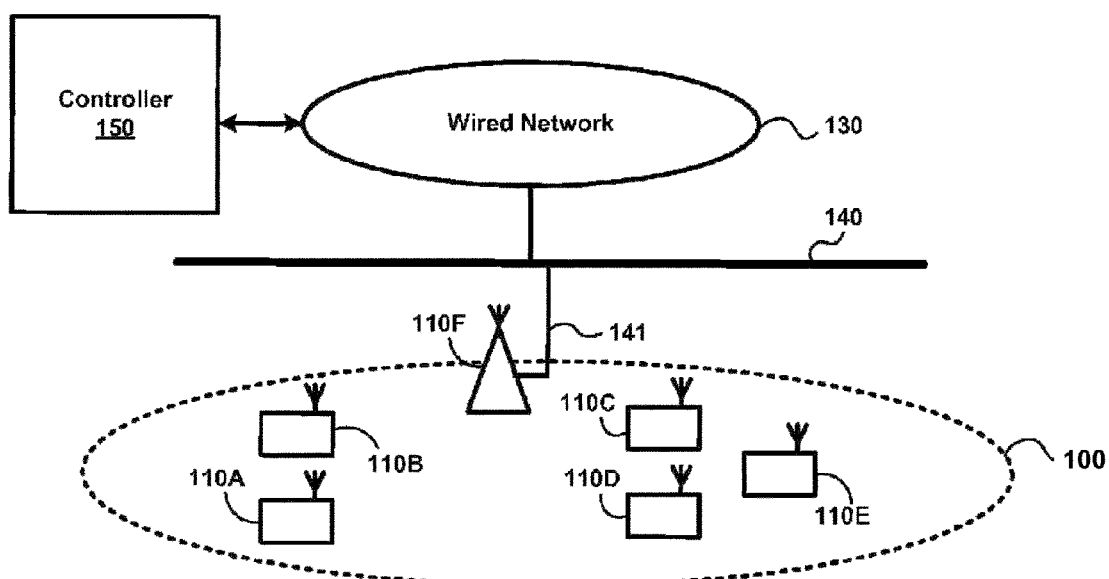
FIG. 1 is a block diagram of an exemplary wireless communication system.

FIG. 1 illustrates an exemplary network including both wired and wireless components. It will be appreciated that the network shown in FIG. 1 and described herein is exemplary and fewer or additional components may be included in the network and other variations may be made to the exemplary network are contemplated. In addition, although certain features of the network are described with reference to a network consistent with the IEEE 802.11 standards; it will be appreciated that the invention may be implemented in networks operating with other wireless network standards, such as, for example, HIPERLAN, IEEE 802.16, Bluetooth, cellular technologies, such as CDMA, WCDMA, LTE, etc., and others, or other non-standards-based wireless networks.

The network 100 illustrated in FIG. 1A includes clients 110A-110E, access point (AP) 110F, wired network 130, wired network backbone 140 and wireless network manager 150. A client represents a basic service set (BSS) consistent with the 802.11 standard; however, as explained above, other wireless implementations are contemplated. The term clients as used herein refers to both end devices (e.g., wireless stations) and an access point.

A wireless local area network (WLAN) generally refers to a wireless network, which facilitates multiple devices to communicate with each other over a wireless medium, and typically includes both wireless stations and an access point. Wireless stations refer to end devices, which transmit and receive packets for communication with other wireless stations and/or other devices within or external to the WLAN. Access points typically refer to devices that are typically intended for receiving and transmitting packets to and receiving packets from the wireless stations and devices external to the WLAN. Access points also manage access to the network, controlling which stations may join, authenticating stations and managing security mechanisms. Access points typically forward or switch packets, send periodic beacons and in general communicate using packet formats designed for operation as an access point.

Access point 110F is connected by a wired medium 141 to wired network backbone 140, which is connected to wired network 130. Each of the clients 110A-110E may communicate with access point 110F as well as with one another wirelessly. The client devices 110A-110E communicate with the wired network 130 through the access point 110F. The wired network 130 may represent the Internet or World Wide Web. The clients 110A-110E may be, for example, a laptop computer, smart phone, wireless sensor, or the like.

Wireless network manager 150 transmits configuration and control messages to the access point 110F. Configuration and control messages that are addressed to the clients 110A-110E are forwarded by the access point 110F to the intended client device recipient 110A-110E by sending either a unicast or a broadcast message. Although the wireless network manager 150 is shown as a separate component from the access point 110F in FIG. 1, it will be appreciated that the functionality of the wireless network manager 150 may be integrated within the access point 110F.

Wireless network manager 150 may additionally be designed to operate as a controller of the BSS and issue network commands to and receive data from one or more of the client devices 110A-110E, and may thus operate to provide certain desired features, such as, for example, building or plant automation, monitoring medical patients, remotely controlling a content storage device, etc. depending on the environment in which the network is deployed. The data received from the client devices 110A-110E may represent measured values of desired parameters, such as, for example, temperature, pressure, humidity, etc. in the case of building automation, measured medical data (e.g., heartbeat, blood pressure, blood glucose, temperature, etc.) about the patient in the case of medical monitoring, video or other data type content in the case of remote control of a content storage device. For example, the access point 110F may be a remote control that controls a client device 110A, and the client device 110A may be a GoPro video recorder. In another example, the client device 110A may be a human wearable tag for collecting blood pressure and the access point 110F may be a mobile phone for communicating the collected blood pressure data to a remote server accessible by a health care professional. It will be appreciated that embodiments of the invention may be implemented in numerous other scenarios.

One or more of client devices 110A-110E may be designed to operate in a "power-save" mode. For example, in the context of IEEE 802.11 standards operation, a client device (e.g., client device 110A) may operate in the standard Power Save Poll Mode (PSPM, or power-save mode, in general). Upon joining the BSS, the client device 110A periodically "wakes up", i.e., powers-ON for full functionality from a low power state, to transmit data to or receive data from the access point 110F or other client devices 110B-110E.

Figure 2:
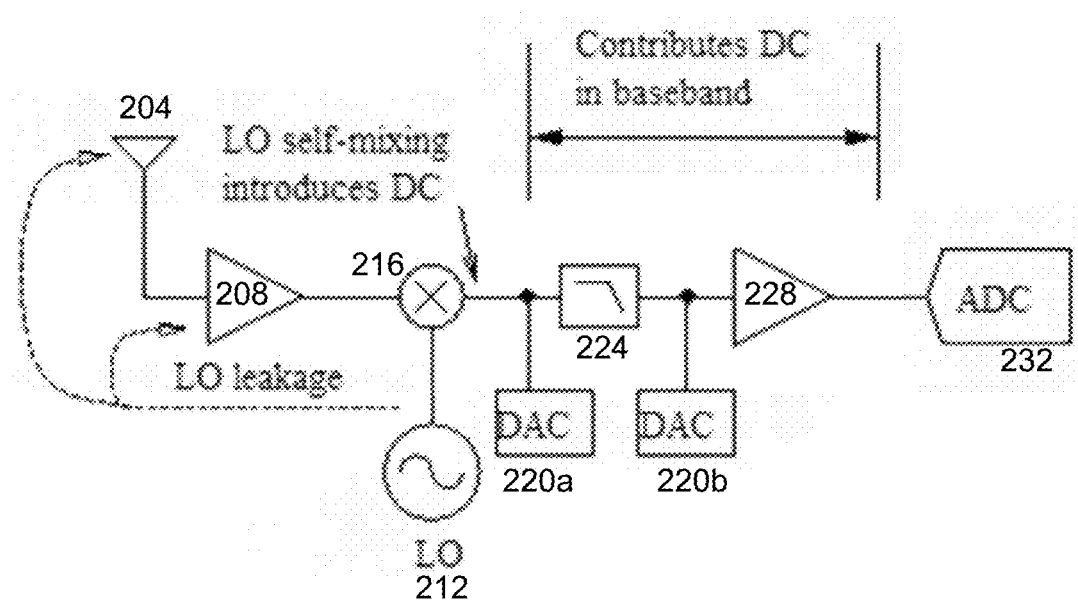
FIG. 2 is a schematic diagram of a portion of a wireless device.

FIG. 2 illustrates a radio frequency (RF) front end of a typical wireless device, such as client devices 110A-110E. The front end includes an antenna 204, a low noise amplifier (LNA) 208, a local oscillator (LO) 212, a mixer 216, digital to analog converters (DAC) 220a, 220b, a filter 224, an intermediate frequency (IF) amplifier 228, and an analog to digital baseband converter (ADC) 232. As shown in FIG. 2, the DACs 220a and 220b, the filter 224 and the IF amplifier 228 contribute DC in the baseband. Furthermore, the leakage and self-mixing from the LO 212 introduce DC into the circuit, which are both undesirable.

Embodiments of the invention include an energy detection algorithm to decide whether the signal is clean enough that it can be used to for DC measurements and an averaging algorithm tightly coupled with the energy detection algorithm that averages the DC measurements to further eliminate the uncertainty in the measurements. Embodiments of the invention use averaging to remove linear interference, use long averaging window to remove carrier/sub-carrier close to the receiver LO, and monitor the total energy in the data captures and rejects those captures with high energy. In one embodiment, captures above about 10 dB are rejected. Embodiments of the invention are also directed to a calibration or cancellation algorithm that adjusts the DC cancellation according to the energy detection measurements in a closed-loop fashion to cancel the DC offset to a predefined range.

Instead of trying to distinguish all kind of interferences, the energy detection algorithm measures the total power in-band. If the measured value shows an abrupt increase from current value, the signal is considered jammed and should be discarded. An abrupt decrease is acceptable because this can happen if the current value was arrived from power measured with jammers. To further smooth out the randomness due to the nature of thermal noise (modeled as Gaussian), a moving average had been applied to the DC offset measurements.

Figure 3A:
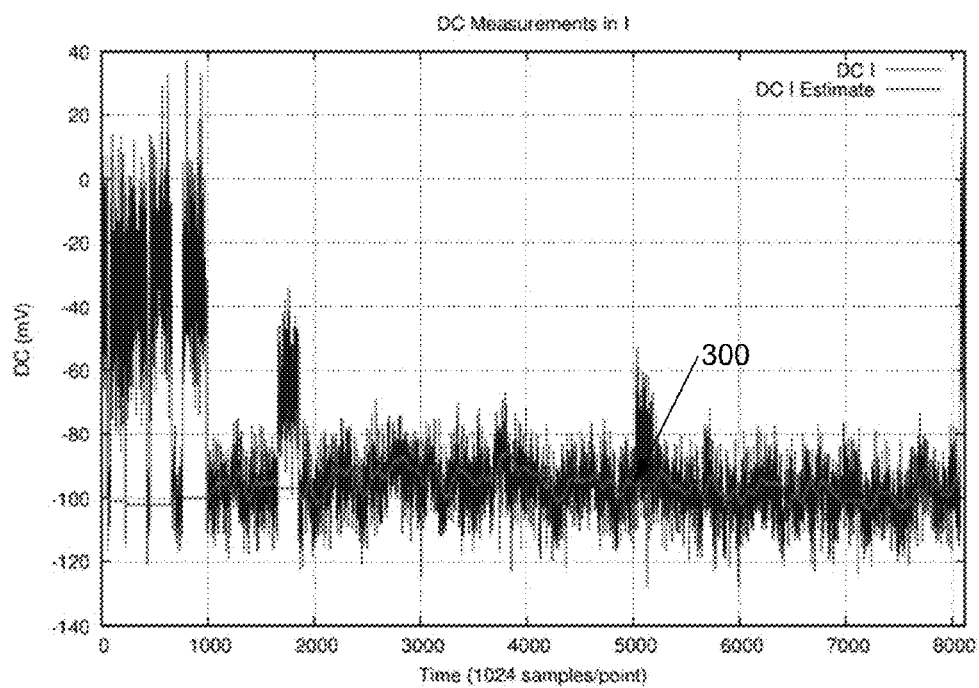
FIGS. 3A and 3B are graphs showing DC estimates for a wireless device with the antenna connected in accordance with one embodiment of the invention.
Figure 3B:
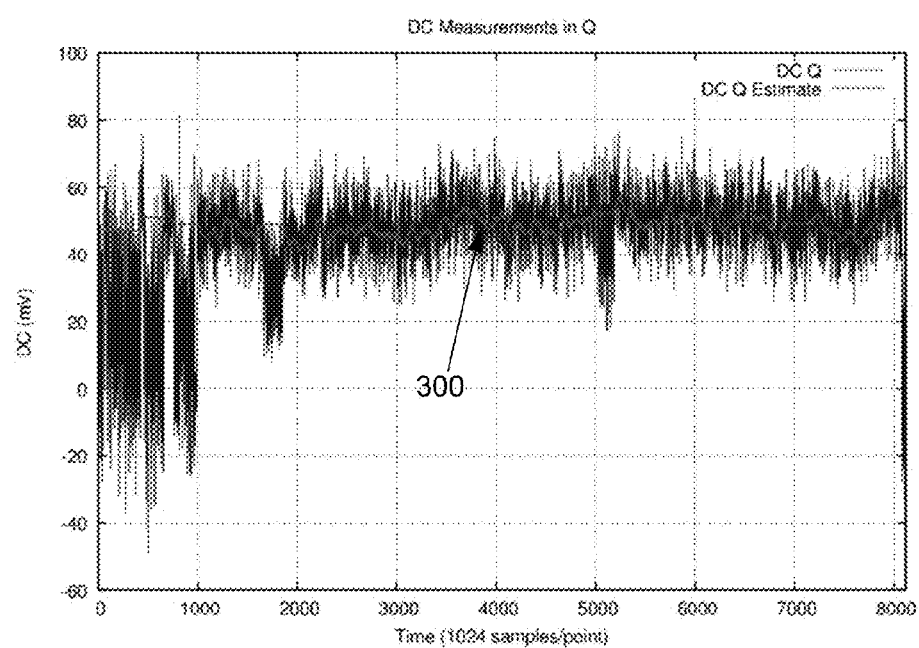

FIGS. 3A and 3B illustrate the tracking capability of the algorithm. FIG. 3A illustrates measurement of the DC value of the signal over a period of time in the I-band, and FIG. 3B illustrates measurement of the DC value of the signal over a period of time in the Q-band. The energy detection and averaging algorithms described herein are able to estimate the DC offset of the system, as reflected by line 300 in both FIGS. 3A and 3B. Despite the strong interference at the beginning in both FIGS. 3A and 3B, the algorithms converged to the target region quickly. The DC offset estimate tracks the fluctuation in the system well.

Figure 4A:
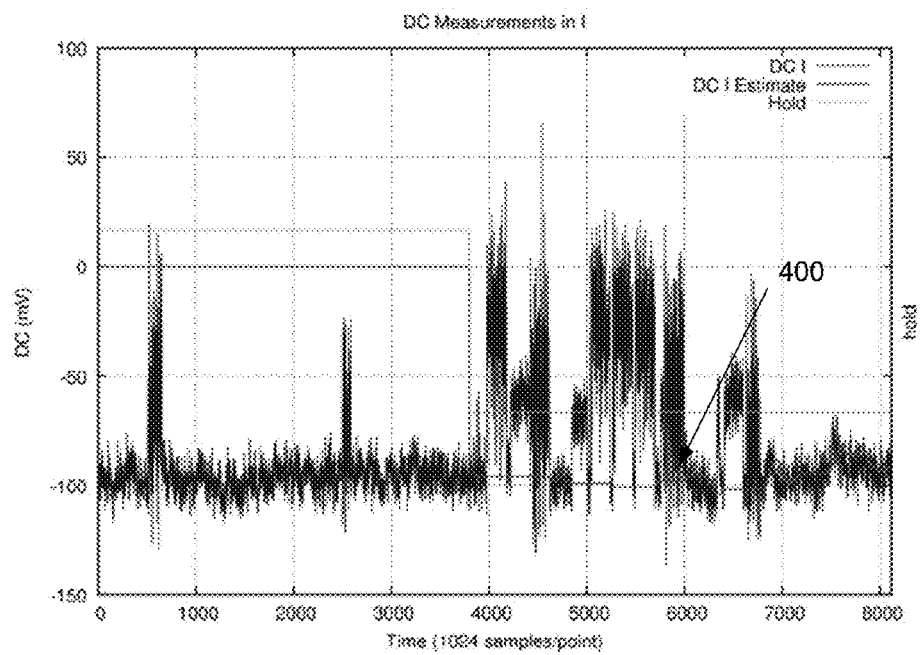
FIGS. 4A and 4B are graphs showing DC estimates for a wireless device with the antenna connected in accordance with one embodiment of the invention.
Figure 4B:
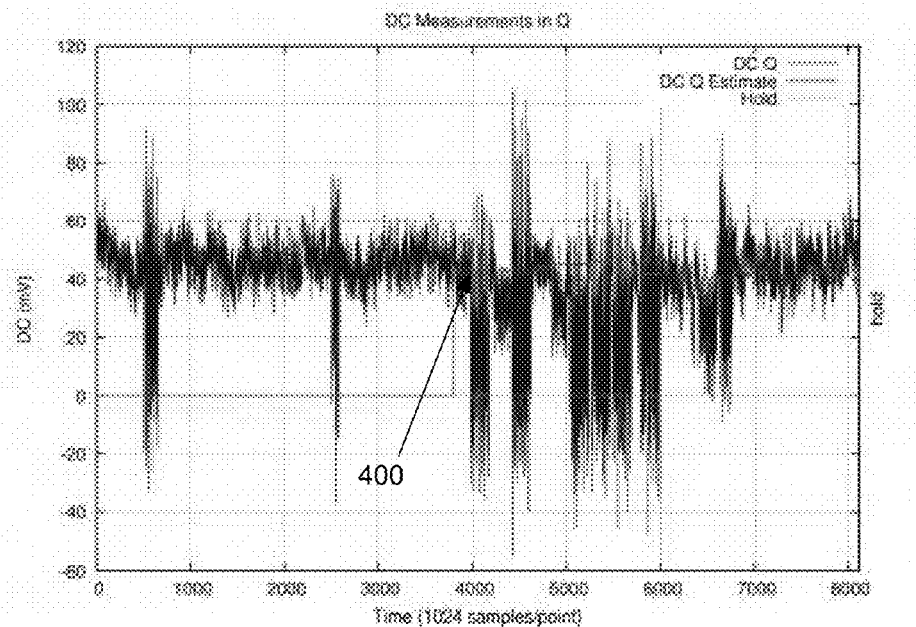

FIGS. 4A and 4B further illustrate the robustness of the energy detection and averaging algorithm. In FIGS. 4A and 5B, the process was put on "hold" for a certain amount of time to start just before some high power packets came in. In FIGS. 4A and 4B, there is a "hold" signal that indicates the starting point of the process at its falling edge. In FIGS. 4A and 4B, the algorithms were able to determine the DC of the system as shown by lines 400.

Figure 5A:
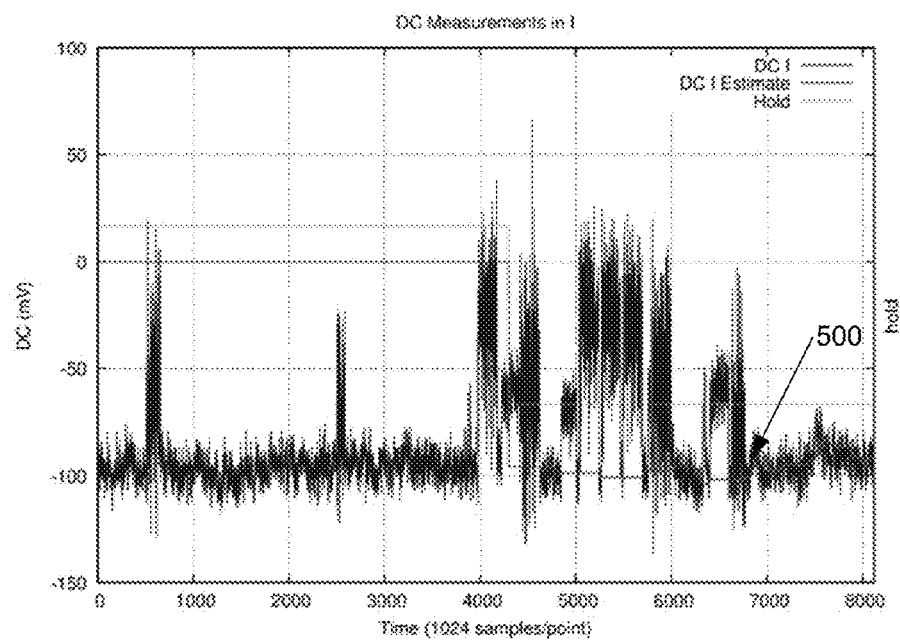
FIGS. 5A and 5B are graphs showing DC estimates for a wireless device with the antenna connected in accordance with one embodiment of the invention.
Figure 5B:
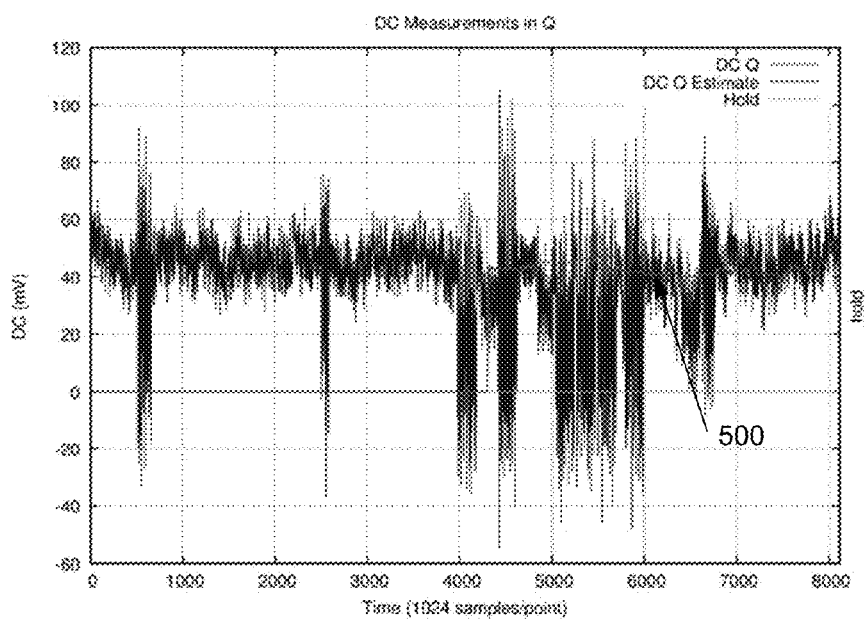

FIGS. 5A and 5B illustrate that the algorithms work when they are started in the middle of receipt of packets. Again, the algorithm converged to the target region quickly as reflected by the DC offset estimate 500.

Details of the exemplary energy detection and averaging algorithm for determining the DC offset of the wireless device will now be described. In one embodiment, the following procedure is performed each time when the receiver has filled the 1024-sample buffer from the ADC. First, the average of 1024 samples is determined to obtain the DC of the system. The total power of the 1024 samples is computed—this value includes the contribution of DC. The AC power is computed by subtracting DC power (voltage squared) from the total power. This AC power is compared with a predetermined threshold. In one embodiment, the predetermined threshold is 0.5 dB above current power value. It will be appreciated that the predetermined threshold may be any value or range of values less than 0.05 dB or any value or range of values greater than 0.05 dB. If the new AC power is higher than this threshold, the new measurement is ignored. If the new AC power is below this threshold, the moving average buffers are updated. The new averaged AC power and DC offsets are computed from the data in buffers.

In one embodiment, there is a counter to count the number of ignored measurements. This counter is reset to 0 each time an update occurs. In one embodiment, the buffers need to be re-initialized when this counter exceeds 3,000 (current setting that is more than 38 ms).

Current IQ ADCs' outputs are 10-bit SIGNED integers and the processor supports 32-bit SIGNED integers natively. The process of computing the averaged power or DC will not cause any over flow for the given 1024-sample size. In the example, the current averaged power is Pc and the new measurement is Pn. Using the 0.5 dB criterion, Pc is compared with Pn×1122/1000. Once Pn has passed the test, the moving average buffer is updated with this new measurement (both power and DC in their respective buffers), and the averaging results. If the sum of the values in the buffer is Sn at time n, the averaged result is simply Sn/64.

Figure 6:
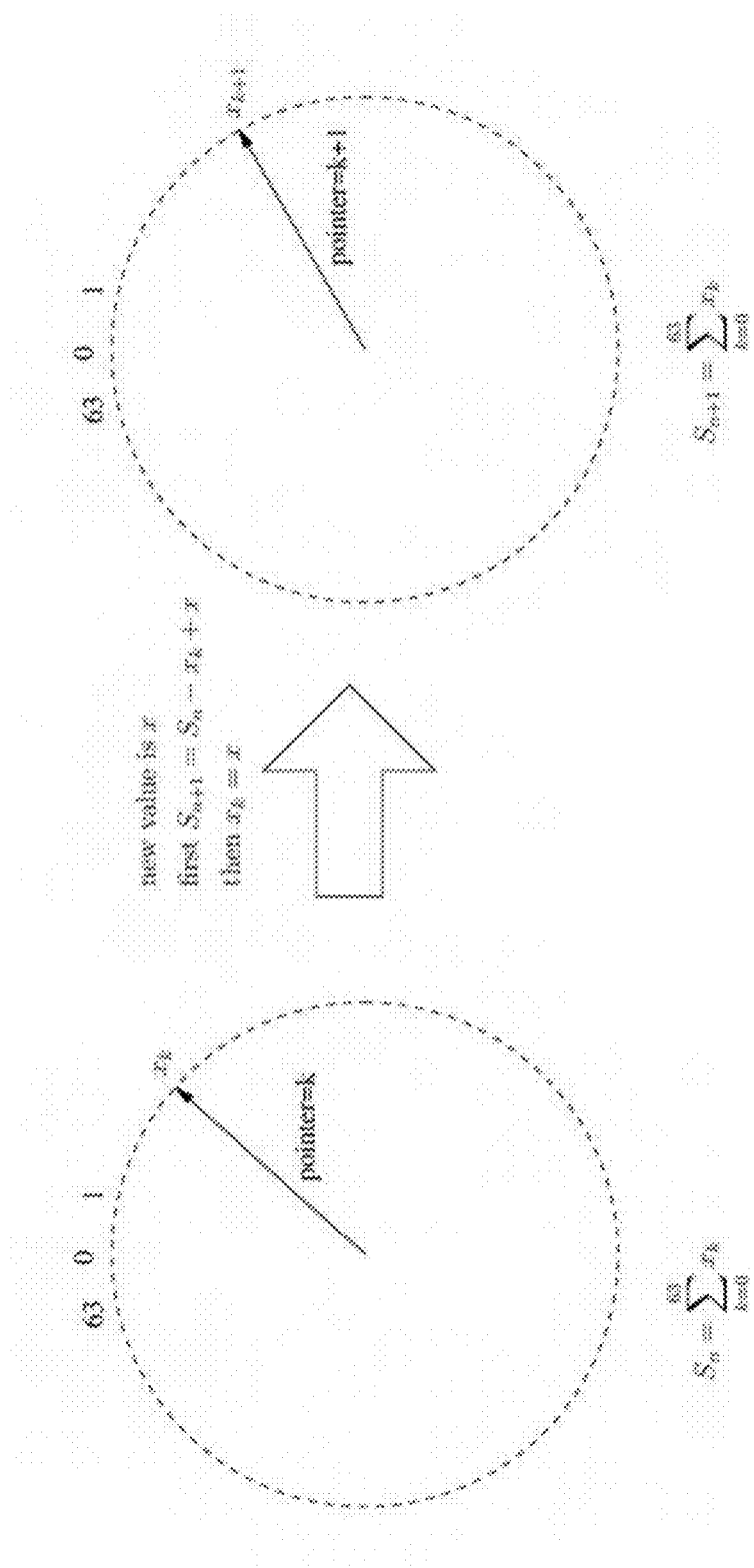
FIG. 6 is a schematic diagram showing DC offset calibration in accordance with one embodiment of the invention.

The new value is denoted as x in FIG. 6. At time n, the sum Sn is used to update the results and the buffer with the new value x, and Sn+1=Sn−xk+x is updated assuming the pointer was pointing to location k in the buffer. Then, the old value xk is replaced with x. After these operations, the pointer is increased to point to next position. The pointer shown in FIG. 6 can be implemented as an increasing integer p modulo 64, i.e., p is the remainder of p divided by 64. It can also be implemented as p bitwise and 63.

Figure 7:
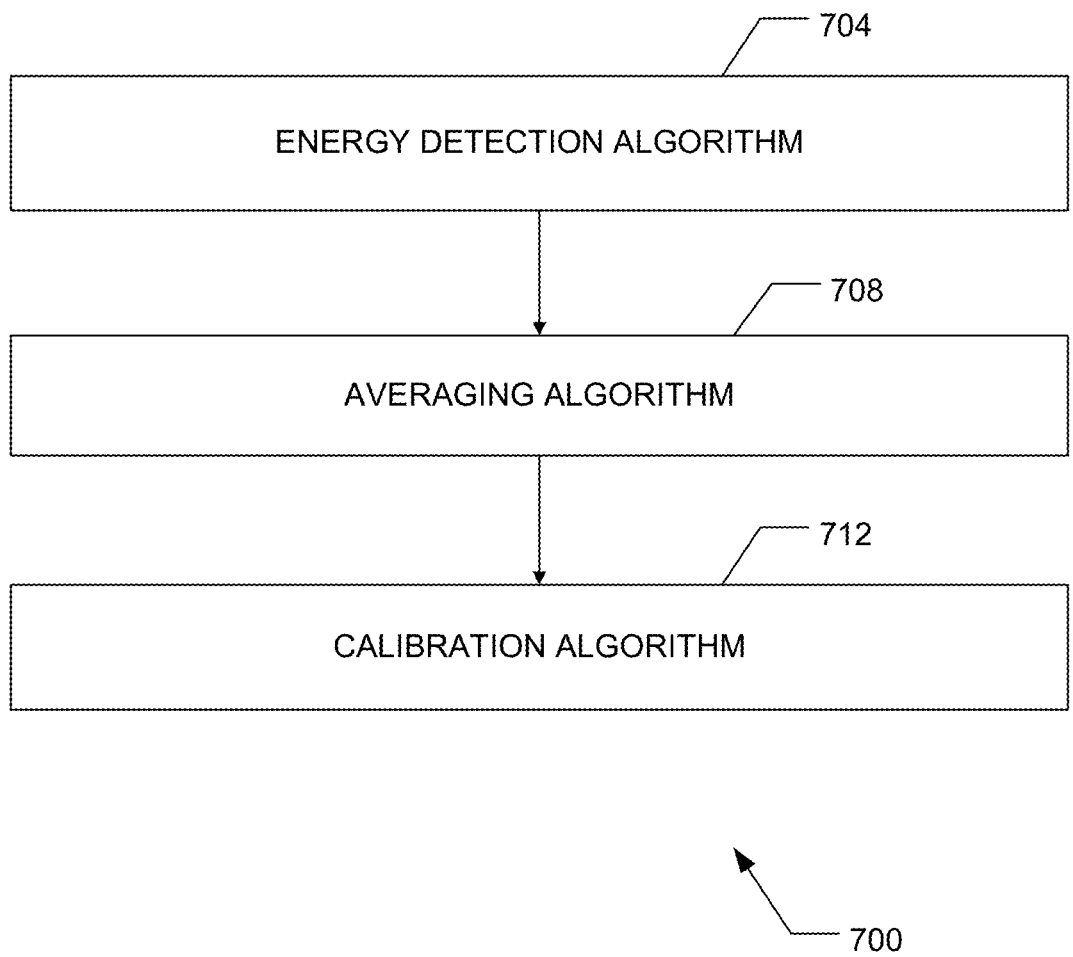
FIG. 7 is a flow diagram showing a method for DC offset calibration of a wireless device with the antenna connected in accordance with one embodiment of the invention.

FIG. 7 illustrates a method of calibrating a wireless device in accordance with one embodiment of the invention. As shown in FIG. 7, the process 700 begins by performing an energy detection algorithm (block 704), followed by an averaging algorithm (block 708). The process 700 continues by performing a calibration algorithm (block 712).

Figure 8:
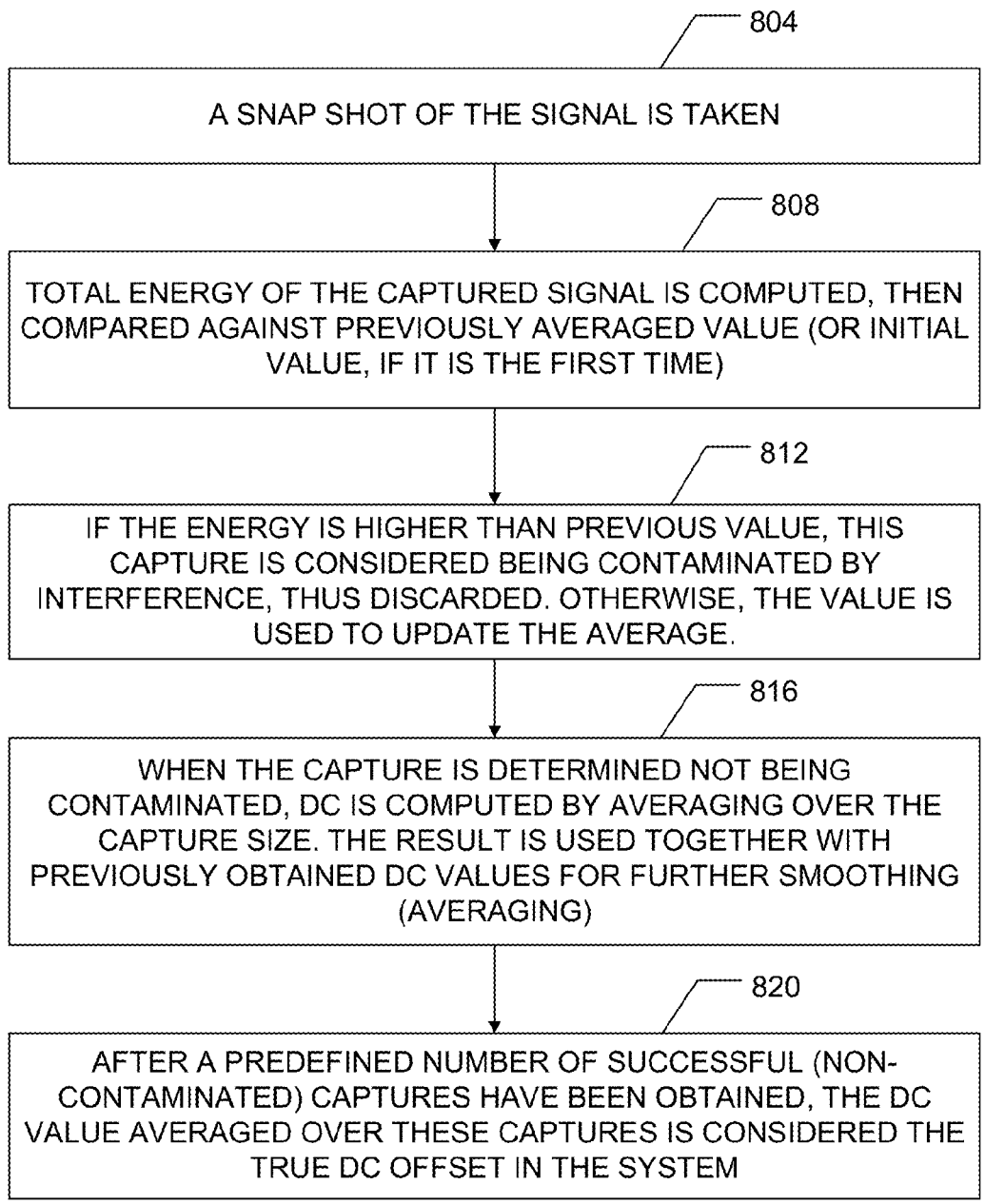
FIG. 8 is a detailed flow diagram showing a method for DC offset determination for a wireless device with the antenna connected in accordance with one embodiment of the invention.

FIG. 8 illustrates a detailed method of performing the energy detection and averaging algorithms in accordance with one embodiment of the invention.

As shown in FIG. 8, the method 800 begins by taking a snap shot of the signal (block 804).

The method 800 continues by computing the total energy of the captured signal (block 808). The total energy is compared either against the previously averaged value or is set as the initial value if it is the first time data is being captured.

The method 800 continues by identifying the captured data as being contaminated if the energy is higher than previous value and discarding the data (block 812). If the data is not higher than the previous value, the captured data value is used to update the average (block 812).

The method 800 continues by determining the DC by averaging over the capture size if the capture is determined to not be contaminated in the previous step (block 816). The result is used together with previously obtained DC values for further smoothing (averaging) (block 816).

The method 800 continues by averaging the DC values to determine the true DC offset of the wireless device (block 820). In one embodiment, the DC value is averaged after a predefined number of successful (non-contaminated) captures have been obtained. For example, the predefined number may be any value or range of values between about three and twenty captures.

The energy detection algorithm and the averaging algorithm coupled with the energy detection are described above with reference to FIG. 8. The wireless device's immunity to interference depends on these algorithms. Energy detection ensures the captured information is not contaminated; the averaging algorithm only takes clean data passed through energy detection.

Figure 9:
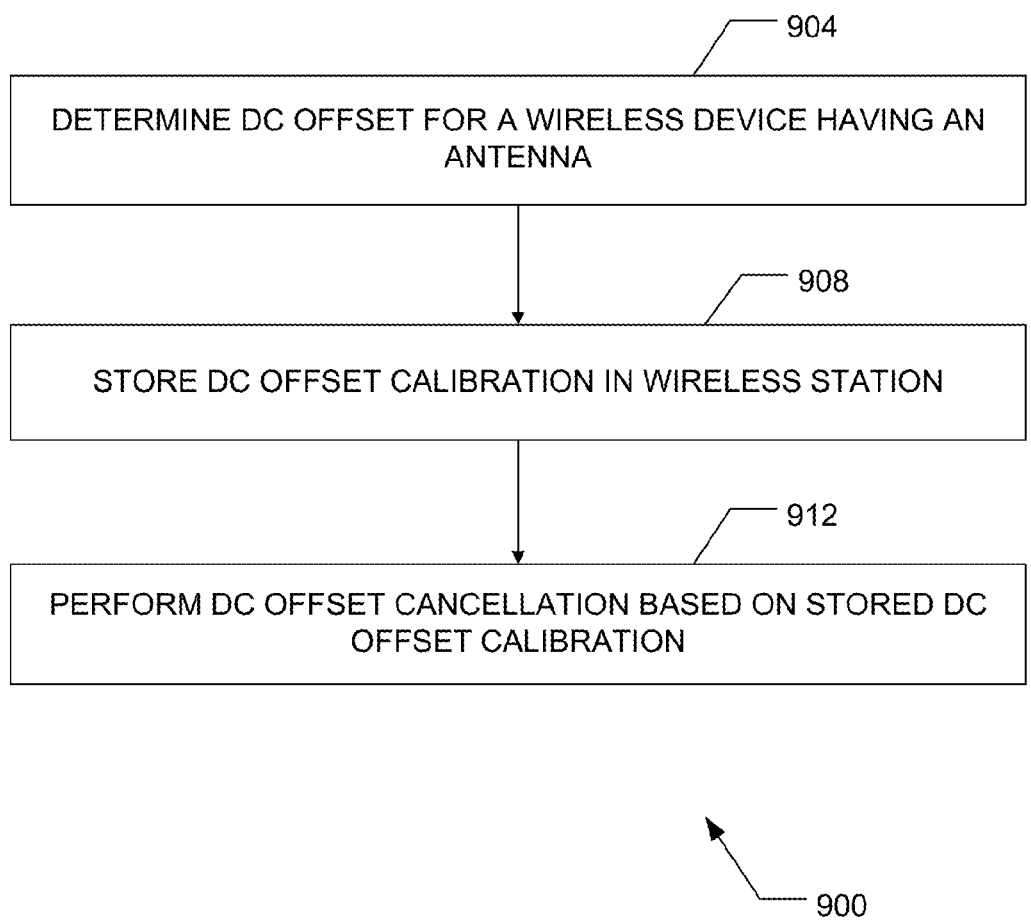
FIG. 9 is a flow diagram of a method for calibrating a wireless device with the antenna connected in accordance with one embodiment of the invention.

The calibration algorithm completes the DC offset cancellation. FIG. 9 illustrates an exemplary method for performing the DC offset cancellation. As shown in FIG. 9, the method 900 beings by determining the DC offset for a wireless device having an antenna (block 904). For example, the energy detection and averaging algorithms described above with reference to FIG. 8 may be used to determine the DC offset of the wireless device. The method 900 continues by storing the DC offset in memory of the wireless device (block 908).

The method 900 continues by performing DC offset cancellation based on the stored DC offset (block 912). The closed-loop DC cancelation takes the output from the averaging algorithm to complete cancellation. The closed-loop cancelation can achieve good results only when there is accurate DC offset measurement provided by energy detection and averaging. The calibration algorithm can be changed for different architectures. It will be appreciated that the calibration algorithm is not required if the sole purpose is just to characterize DC offset in the receiver.

The DC offset may be injected in the digital domain, baseband or multiple locations. The gain can be determined at each stage and the gain can be changed with multiple measurements. In one embodiment, the DC offset calibration is performed by adjusting the value at the digital to analog converter. In another embodiment, the DC offset calibration is performed by adjusting the gain at the receive chain. It will be appreciated that the DC offset calibration may be performed by adjusting the gain in multiple components of the wireless device.

Figure 10:
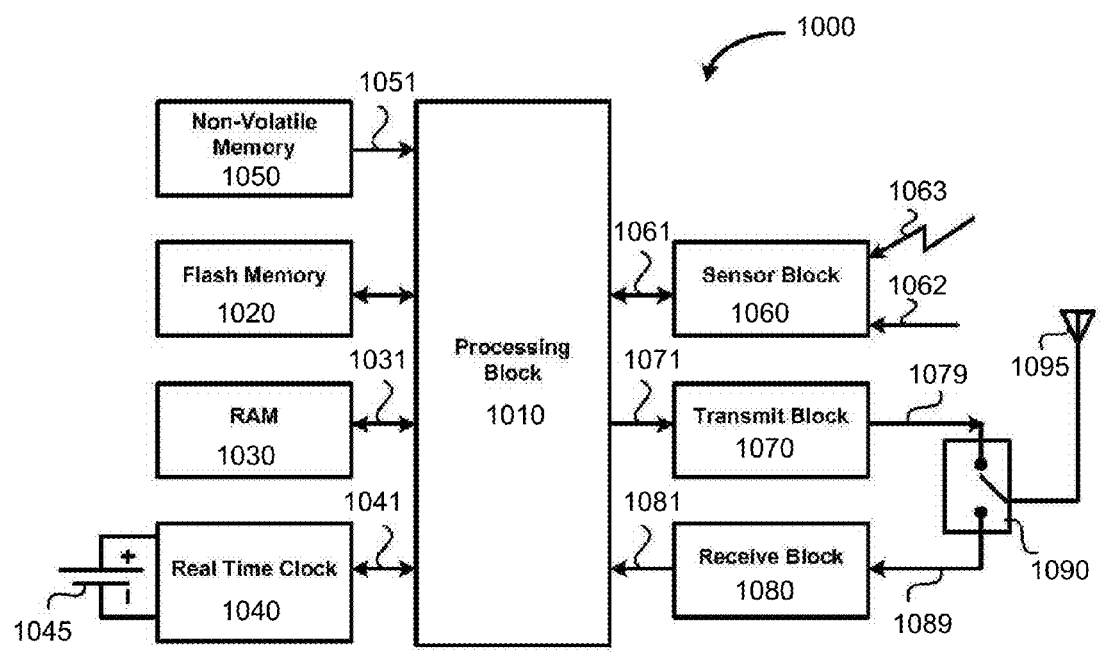
FIG. 10 is a block diagram of a wireless device in accordance with one embodiment of the invention.

FIG. 10 illustrates exemplary components of a wireless device 1000. The wireless device 1000 corresponds to the wireless station or client device 110A-110E shown in FIG. 1 and described herein. It will be appreciated that the access point 110F typically includes the similar components to those shown in FIG. 10; however, the access point 110F may include fewer components than shown in the wireless device of FIG. 10 and may also include additional components than those shown in FIG. 10, and that the arrangement of the components may differ.

Exemplary implementations of wireless device 1000 are disclosed in U.S. Pat. No. 7,941,682, entitled "Optimum Power Management of System on Chip Based on Tiered States of Operation", issued May 10, 2011, and U.S. Patent Publication Nos. 2009/0016251, entitled "Management System and Method of Low Power Consuming Devices, filed Jul. 13, 2007, 2009/0077404, entitled "Method and System for Reducing Power Consumption of System on Chip Based Analog-to-Digital Control Circuitry," filed Sep. 14, 2007, each of which is assigned to Gainspan, Inc., the entireties of each of which are hereby incorporated by reference. It will be appreciated that other implementations of the wireless device 1000 are contemplated and such wireless device 1000 should not be limited to the disclosures incorporated by reference or the exemplary wireless device illustrated in FIG. 10.

Wireless device 1000 includes a data processing system 1010, flash memory 1020, random access (RAM) memory 1030 a real-time clock (RTC) 1040, power supply 1045, non-volatile memory 1050, sensor(s) 1060, a transmitter 1070, a receiver 1080, switch 1090 and antenna 1095. It will be appreciated that the wireless device 1000 may be implemented as a system-on-chip (SoC) or as separate integrated circuits (IC) or combinations thereof. Additionally, it will be appreciated that the wireless device 1000 may have fewer or greater components than those shown in FIG. 10 and that the arrangement of the components shown in FIG. 10 may differ.

Data processing system 1010 is a processor that may contain one or more processing units. In embodiments in which the data processing system 1000 includes multiple processing units, each processing unit may be designed for a specific task. Alternatively, the data processing system 1010 may contain a general purpose processing unit. In yet another embodiment, the data process system 1010 may contain multiple general purpose processing units that share processing for all tasks in a mutual way.

Flash memory 1020 contains memory locations organized as blocks. A block represents a set of memory locations (typically continuous in terms of memory address) which are to be all erased before data can be rewritten into any location. Flash memory 1020 may be used to store data from sensor(s) 1060 via data processing system 1010 and/or store program code.

RAM 1030 and non-volatile memory 1050 (which may be implemented in the form of read-only memory (ROM)) constitute computer program products or machine readable medium which provide instructions to data processing system 1010. RAM 1030 communicates with data processing system via path 1031. The non-volatile memory 1050 may include sub-components (not shown), such as OTP and EEPROM.

RTC 1040 operates as a clock and provides the current time to data processing system 1010 on path 1041. RTC 1040 may be backed-up by power supply 1045. RTC 1040 may also contain memory to store critical information received from the data processing system 1010.

Non-volatile memory 1050 is a non-transitory computer readable medium that stores instructions, which when executed by the data processing system 1010, cause the wireless device 1000 to process the data and messages received from the receiver and generate the data and messages for transmission by the transmitter. The non-volatile memory communicates with data process system 1010 via path 1051.

Sensor(s) 1060 may include one or more sensors as well as corresponding signal conditioning circuitry. As an alternative, sensor(s) may instead be any data capture device, such as a video recording device or other data collection or capture devices. Sensed parameters or data are transmitted on path 1061 via a wired path 1062 or wireless path 1063.

Transmitter 1070 receives data to be transmitted from data processing system 1010 on path 1071. Further, the transmitter 1070 generates a modulated radio frequency (RF) signal according to IEEE 802.11 standards and transmits the RF signal via switch 1090 and antenna 1095.

Receiver 1080 receives an RF signal bearing data via switch 1090 and antenna 1095. The receiver 1080 further demodulates the RF signal and provides extracted data to the data processing system 1010 on path 1081.

Antenna 1095 operates to receive from and transmit to a wireless medium wireless signals containing data and messages. Switch 1090 may be controlled by the data processing system 1010 to connect antenna 1095 to the receiver 1080 via path 1089 or transmitter via path 1079 depending on whether the wireless station is receiving or transmitting.

One or more of the methodologies or functions described herein may be embodied in a computer-readable medium on which is stored one or more sets of instructions (e.g., software). The software may reside, completely or at least partially, within memory, as described above, and/or within the data processing system during execution thereof. The software may further be transmitted or received over a network.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the invention. The term "computer-readable medium" shall accordingly be taken to include, but not be limited to, solid-state memories, and optical and magnetic media.

Embodiments of the invention have been described through processes or flow diagrams at times, which are defined by executable instructions recorded on computer readable media which cause a computer, microprocessors or chipsets to perform method steps when executed. The process steps have been segregated for the sake of clarity. However, it should be understood that the steps need not correspond to discreet blocks of code and the described steps can be carried out by the execution of various code portions stored on various media and executed at various times.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The invention has been described in relation to particular examples, which are intended in all respects to be illustrative rather than restrictive. Those skilled in the art will appreciate that many different combinations of hardware, software, and firmware will be suitable for practicing the present invention.

The present invention has been described in relation to particular examples, which are intended in all respects to be illustrative rather than restrictive. Those skilled in the art will appreciate that many different combinations will be suitable for practicing the present invention. Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A wireless device comprising:
   a receiver to receive a receive signal from one or more other wireless devices;
   an antenna connected to the receiver;
   a processor to determine a DC offset value of the wireless device with the antenna connected by performing energy detection and averaging, and calibrate the wireless device using the determined DC offset value,
   wherein the energy detection and averaging comprise, each time when the receiver has filled a sample buffer of an analog to digital converter with a plurality of samples, determining an average of the plurality of the samples in the sample buffer to obtain a DC power of the system, computing a total power of the plurality of the samples, computing an AC power of the plurality of samples by subtracting the DC power from the total power, comparing the AC power to a predetermined threshold, wherein only if the AC power is higher than the predetermined threshold, the AC power and the DC power are rejected, and only if the AC power is below the predetermined threshold, moving average buffers are updated with the AC power and the DC power, and wherein an averaged AC power and the DC offset value are determined by averaging the AC power with previous AC power values and averaging the DC power with previous DC power values in the moving average buffers, respectively; and
   memory to store the DC offset value.

2. The wireless device of claim 1, further comprising a digital to analog converter, and wherein the wireless device is calibrated by adjusting the value at the digital to analog converter.

3. The wireless device of claim 1, further comprising a receive chain, and wherein the wireless device is calibrated by adjusting a gain at the receive chain.

4. The wireless device of claim 1, wherein the wireless device is calibrated by adjusting a gain in multiple components of the wireless device.

5. A method comprising:
   receiving a plurality of receive signals at a receiver of a wireless device;
   performing energy detection and averaging on the plurality of received signals in a processor of a wireless device to determine a DC offset, the wireless device comprising an antenna,
   wherein performing the energy detection and averaging comprises, each time the receiver has filled a sample buffer of an analog to digital converter with a plurality of samples of the plurality of received signals, determining an average of the plurality of samples in the sample buffer to obtain a DC power of the system, computing a total power of the plurality of samples, and computing an AC power of the plurality of samples by subtracting the DC power from the total power;
   comparing the AC power determined with a predetermined threshold, wherein the predetermined threshold comprises previously averaged values of energy of previously received signals of the plurality of receive signals, wherein only if the AC power is higher than the predetermined threshold, the AC power and the DC power are rejected, and only if the AC power is below the predetermined threshold, moving average buffers are updated with the AC power and the DC power; and
   determining an averaged AC power and the DC offset by averaging the AC power with previous AC power values and averaging the DC power with previous DC power values in the moving average buffers, respectively; and
   storing the DC offset in memory of the wireless device.

6. The method of claim 5, further comprising performing calibration to adjust a DC cancellation based on the determined DC offset.

7. The method of claim 6, wherein the DC cancellation is adjusted in a closed-loop fashion to cancel the DC offset to within a predefined range for the wireless device.

8. The method of claim 5, wherein the total energy is used to update a previously averaged value if the total energy is the same as or lower than the previously averaged value.

9. The method of claim 6, wherein the wireless device is calibrated by adjusting a gain at a digital to analog converter.

10. The method of claim 6, wherein the wireless device is calibrated by adjusting a gain at a receive chain.

11. The method of claim 6, wherein the wireless device is calibrated by adjusting a gain in multiple components of the wireless device.

* * * * *